United States Patent
Hayashi et al.

(10) Patent No.: US 10,776,044 B2
(45) Date of Patent: Sep. 15, 2020

(54) STORAGE APPARATUS, DATA MANAGEMENT METHOD, AND NON-TRANSITORY COMPUTER READABLE MEDIUM

(71) Applicant: HITACHI, LTD., Tokyo (JP)

(72) Inventors: Shinya Hayashi, Tokyo (JP); Toshiaki Terao, Tokyo (JP); Shintaro Ito, Tokyo (JP); Atsushi Tashiro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 72 days.

(21) Appl. No.: 16/291,945

(22) Filed: Mar. 4, 2019

(65) Prior Publication Data
US 2019/0332312 A1    Oct. 31, 2019

(30) Foreign Application Priority Data

Apr. 26, 2018  (JP) ................................ 2018-085205

(51) Int. Cl.
| | |
|---|---|
| G06F 12/00 | (2006.01) |
| G06F 3/06 | (2006.01) |
| G06F 12/0831 | (2016.01) |
| G06F 12/084 | (2016.01) |

(52) U.S. Cl.
CPC .......... *G06F 3/0655* (2013.01); *G06F 3/0614* (2013.01); *G06F 3/0679* (2013.01); *G06F 3/0688* (2013.01); *G06F 12/084* (2013.01); *G06F 12/0835* (2013.01)

(58) Field of Classification Search
None
See application file for complete search history.

(56) References Cited

U.S. PATENT DOCUMENTS

| | | | |
|---|---|---|---|
| 5,636,360 A | 6/1997 | Courts et al. | |
| 9,336,132 B1 | 5/2016 | Aron et al. | |
| 2016/0259697 A1 | 9/2016 | Takada et al. | |
| 2019/0179661 A1* | 6/2019 | Dhoolam | G06F 3/0631 |

FOREIGN PATENT DOCUMENTS

| | | |
|---|---|---|
| JP | 06-124223 A | 5/1994 |
| JP | 2003-167678 A | 6/2003 |
| JP | 2012-014735 A | 1/2012 |
| JP | 2015-191414 A | 11/2015 |
| WO | 2015/186165 A1 | 12/2015 |

OTHER PUBLICATIONS

Japanese Office Action dated Oct. 29, 2019 for the Japanese Patent Application No. 2018-085205.

* cited by examiner

*Primary Examiner* — Jason W Blust
(74) *Attorney, Agent, or Firm* — Volpe and Koenig, P.C.

(57) ABSTRACT

A server including a memory unit, a processor unit, and a storage device, wherein the memory unit has: a CM; an SM which stores management information; and a log buffer for storing log data indicating contents of change to the CM and the SM. The storage device has a log chunk for storing the log data, and the processor unit is configured to: store target data corresponding to an I/O request in the CM; generate log data of contents of change with respect to the CM and the SM, and to store the pieces of the generated log data in the log buffer; write a plurality of pieces of log data stored in the log buffer into the log chunk; and transmit, after all of the pieces of log data corresponding to the I/O request are written into the log chunk, a response of good to a request source.

10 Claims, 10 Drawing Sheets

STORAGE APPARATUS, DATA MANAGEMENT METHOD, AND NON-TRANSITORY COMPUTER READABLE MEDIUM

CROSS-REFERENCE TO PRIOR APPLICATION

This application relates to and claims the benefit of priority from Japanese Patent Application No. 2018-085205 filed on Apr. 26, 2018, the entire disclosure of which is incorporated herein by reference.

BACKGROUND

The present invention relates to a storage apparatus and the like which receives an I/O request and manages target data being a target of the I/O request.

Conventionally, storage apparatuses having a storage function for managing data are known. Such a storage apparatus is constituted by dedicated hardware and, when a power failure occurs, protects data in memories (memory data) by saving contents of an SM (Shared Memory) and a CM (Cache Memory) in an SSD (Solid State Drive) using an internal battery.

In recent years, general-purpose servers are being used as storage apparatuses by realizing a storage function using software. In such a storage apparatus, since the hardware is a general-purpose server, a function for protecting memory data using an internal battery is not provided. Therefore, there is a problem in that memory data cannot be protected when a power failure occurs.

For example, as a technique for protecting data during an occurrence of a failure, a technique of storing a log in a fast storage layer such as an SSD during a data write and subsequently storing the data in a slower back-end storage device (for example, refer to U.S. Pat. No. 9,336,132 (Specification)) is known.

SUMMARY

For example, with a storage apparatus constituted by dedicated hardware, memory data cannot be protected when battery backup by an internal battery has not been properly performed.

In addition, with a storage apparatus constituted by a general-purpose server, although a power failure can be coped with by preparing an external battery such as a UPS, there is a problem of added cost of providing the UPS and the like.

The present invention has been made in consideration of the circumstances described above, and an object thereof is to provide a technique that enables necessary data in a memory unit to be protected in an easy and appropriate manner.

In order to achieve the object described above, a storage apparatus according to an aspect is a storage apparatus which receives an I/O request and manages target data being a target of the I/O request, the storage apparatus including: a memory unit, a processor unit, and a non-volatile storage device, wherein the memory unit has: a cache area for temporarily storing the target data; a management area for storing management information for managing the target data in the cache area; and a log buffer for storing log data indicating contents of change with respect to the cache area and log data indicating contents of change with respect to the management area, the non-volatile storage device has a log chunk for storing the log data, and the processor unit is configured to: store, when receiving the I/O request, target data corresponding to the I/O request in the cache area; generate log data of contents of change with respect to the cache area and log data of contents of change with respect to the management area when the target data corresponding to the I/O request is stored in the cache area, and store the pieces of the generated log data in the log buffer; collectively write a plurality of pieces of log data stored in the log buffer into the log chunk; and transmit, after all of the pieces of log data corresponding to the I/O request are written into the log chunk, a response of good indicating that the I/O request was properly processed to a request source of the I/O request.

According to the present invention, necessary data in a memory unit can be protected in an easy and appropriate manner.

DETAILED DESCRIPTION OF THE EMBODIMENT

An embodiment will be described with reference to the drawings. It should be noted that the embodiment described below is not intended to limit the invention as set forth in the accompanying claims and that all of the elements and combinations thereof described in the embodiment are not necessarily essential to solutions proposed by the invention.

In addition, in the following description, a "memory unit" includes one or more memories. The memories are mainly used during processes performed by a processor unit.

Furthermore, in the following description, a "processor unit" includes one or more processors. Typically, at least one processor is a microprocessor such as a CPU (Central Processing Unit). Each of the one or more processors may be a single-core processor or a multi-core processor. A processor may include a hardware circuit which performs a part of or all of a process.

In addition, while a "program" is sometimes considered an operating entity when describing a process in the following description, since a program causes a prescribed process to be performed while using at least one of a memory unit and an interface unit in an appropriate manner by being executed by a processor unit, the processor unit (or a server (a computer) or a computer system that includes the processor unit) may be considered a subject of the process. The program may be installed to a computer from a program source. The program source may be, for example, a program distribution server or a recording medium that can be read by the computer. In addition, in the following description, two or more programs may be realized as one program or one program may be realized as two or more programs.

In addition, in the following description, when describing elements of a same type without distinguishing the elements from one another, reference signs (or a common portion of reference signs) may be used, but when describing elements of a same type by distinguishing the elements from one another, IDs of the elements (or reference signs of the elements) may be used.

First, an outline of the embodiment will be described.

Figure 1:
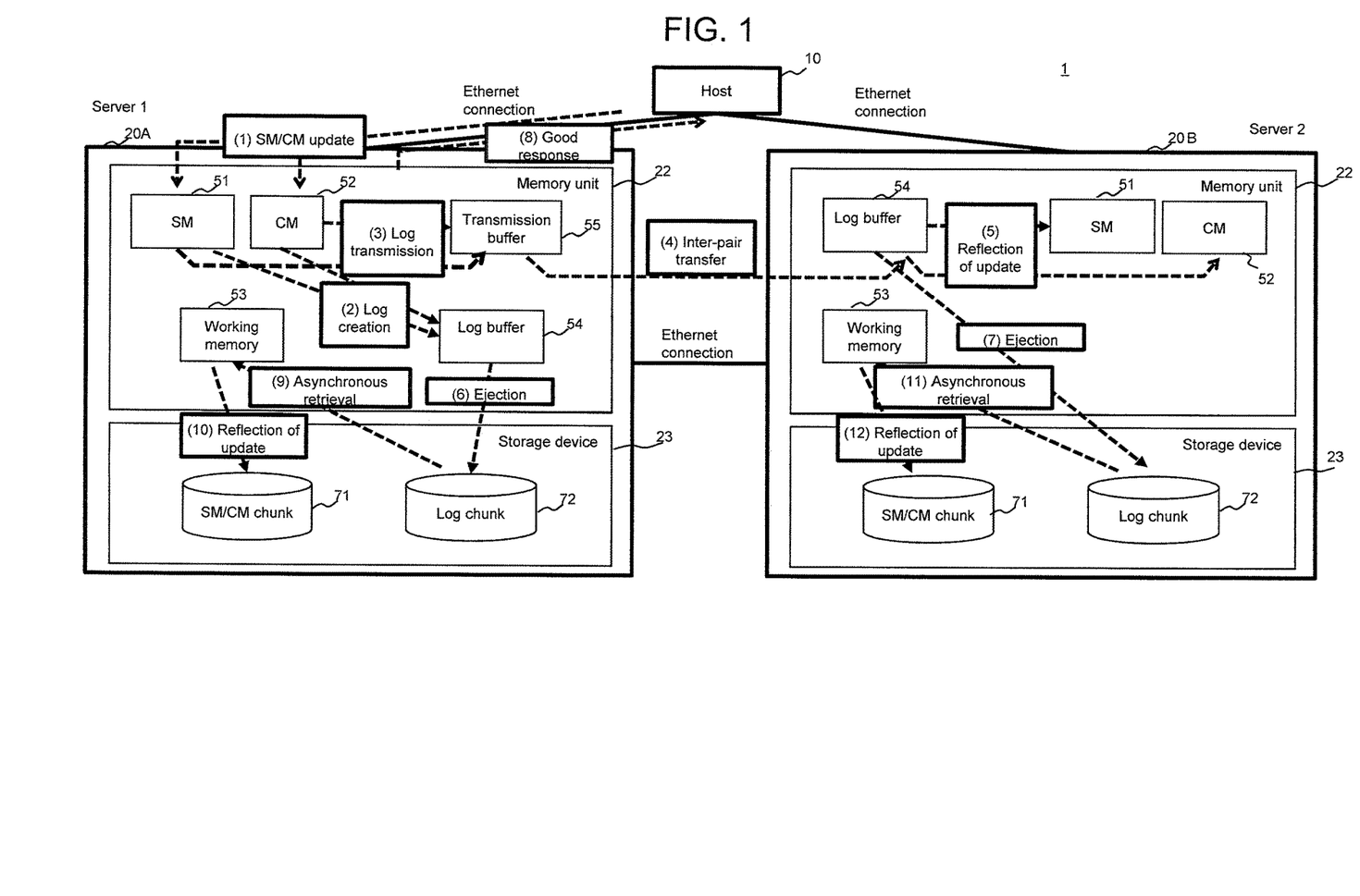
FIG. 1 is a diagram for illustrating an outline of an embodiment.

FIG. 1 is a diagram for illustrating an outline of the embodiment.

In a computer system 1, when an I/O (Input/Output) request is issued to a server 20A (a server 1) from a host 10, the server 20A updates an SM (shared memory) 51 and a CM (cache memory) 52 in response to the I/O request ((1) in FIG. 1). Here, the I/O request is a write request or a read request. For example, when the I/O request is a write request, data that is a write target (target data: write data) included in the write request is stored in the CM 52 and a pointer capable of specifying a storage destination in the CM 52 from information of a storage destination of the write data in a storage device 23 is stored in the SM 51. In addition, when the I/O request is a read request, data that is a read target (target data: read data) which is specified by the read request and which is stored in the storage device 23 is stored in the CM 52 and a pointer capable of specifying a storage destination in the CM 52 from information of a storage destination of the read data in the storage device 23 is stored in the SM 51.

Next, the server 20A creates pieces of log data indicating contents of an update in each of the SM 51 and the CM 52 and stores the pieces of log data in a log buffer 54 ((2) in FIG. 1) and, stores the log data of a target (a target to be managed in duplex) to be stored in a server 20B (a server 2) among the pieces of log data in a transmission buffer 55 ((3) in FIG. 1).

When there are a plurality of pieces of log data stored in the transmission buffer 55, the server 20A collectively transmits the plurality of pieces of log data to the server 20B at a prescribed timing ((4) in FIG. 1). The server 20B stores the log data transmitted from the server 20A in the log buffer 54. Next, the server 20B reflects contents indicated by the log data in the log buffer 54 onto the SM 51 and the CM 52 ((5) in FIG. 1).

Meanwhile, the server 20A stores, in a log chunk 72 of the storage device 23 that is a non-volatile memory device (for example, an SSD (Solid State Drive)), log data (when there are a plurality of pieces of log data, the plurality of pieces of log data) stored in the log buffer 54 ((6) in FIG. 1). In a similar manner, the server 20B stores, in the log chunk 72 of the storage device 23 that is a non-volatile memory device, log data (when there are a plurality of pieces of log data, the plurality of pieces of log data) stored in the log buffer 54 ((7) in FIG. 1). Accordingly, the pieces of log data indicating contents of updates of the SM 51 and the CM 52 are to be stored in the storage device 23 and, even when a power failure occurs, the pieces of log data are kept in a state of being stored in the storage device 23.

Subsequently, the server 20A transmits a response (Good response) indicating that the I/O request has ended properly to the host 10 that is the request source of the I/O request ((8) in FIG. 1).

Subsequently, at a timing that is asynchronous with (unrelated to) the I/O request, the server 20A reads log data stored in the log chunk 72 to a working memory 53 ((9) in FIG. 1) and reflects a change corresponding to the log data in the working memory 53 to an image (a memory image) of the SM 51 and the CM 52 in an SM/CM chunk 71 ((10) in FIG. 1). Accordingly, a memory image of the SM 51 and the CM 52 at a time point of generation of the log data is to be generated in the SM/CM chunk 71. Meanwhile, in a similar manner, the server 20B reads log data stored in the log chunk 72 to the working memory 53 ((11) in FIG. 1) and reflects a change corresponding to the log data in the working memory 53 to an image (a memory image) of the SM 51 and the CM 52 in an SM/CM chunk 71 ((12) in FIG. 1). Accordingly, a memory image (however, a memory image limited to contents of a target to be duplexed) of the SM 51 and the CM 52 at a time point of generation of the log data is to be also generated in the SM/CM chunk 71 of the server 20B.

Next, the computer system according to the embodiment will be described in detail.

Figure 2:
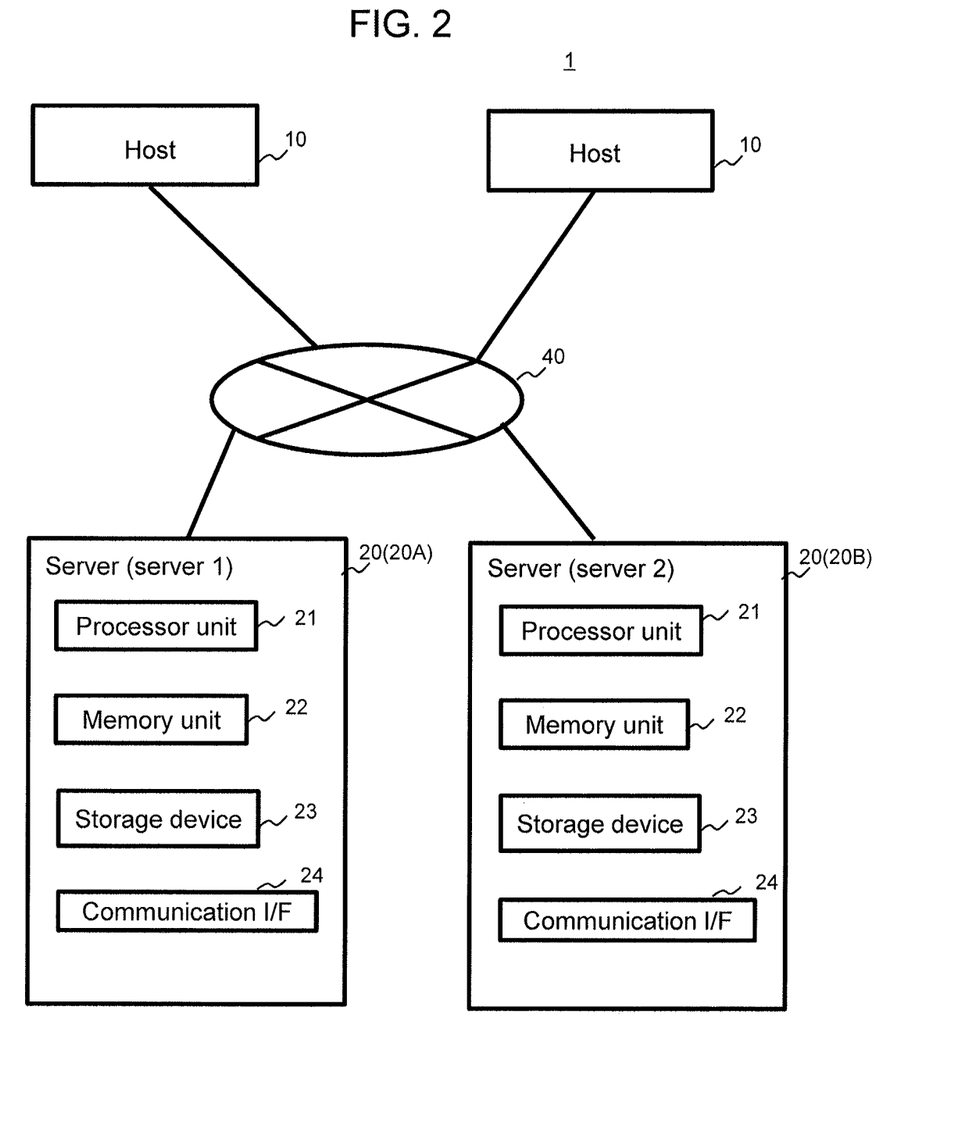
FIG. 2 is an overall configuration diagram of a computer system according to the embodiment.

FIG. 2 is an overall configuration diagram of the computer system according to the embodiment.

The computer system 1 includes one or more hosts 10 and one or more servers 20 (20A and 20B) as examples of a storage apparatus. The host 10 and the server 20 are coupled to each other via a network 40. The network 40 is a wired LAN (Local Area Network), a wireless LAN, or the like.

The host 10 is constituted by, for example, a PC (Personal Computer) and executes various processes. When executing a process, the host 10 issues an I/O request and writes data generated by the process into the server 20 and/or reads data stored in the server 20.

The server 20 is constituted by, for example, a general-purpose server apparatus and includes a processor unit 21, a memory unit 22, a storage device 23, and a communication interface (a communication I/F) 24.

The communication interface 24 is, for example, an interface such as a wired LAN card or a wireless LAN card and mediates communication with another apparatus (for example, another server 20 or host 10) via the network 40. The processor unit 21 executes various processes by executing programs stored in the memory unit 22. The memory unit 22 stores programs to be executed by the processor unit 21, data necessary for performing processes, and the like. The memory unit 22 is constituted by, for example, a volatile memory such as a RAM (Random Access Memory). Therefore, when supply of power to the server 20 is cut off due to a power failure or the like, the memory unit 22 is unable to maintain storage of data. The storage device 23 is, for example, a non-volatile memory device such as an SSD (Solid State Drive) or an HDD (Hard Disk Drive). The storage device 23 is capable of maintaining storage of data even when supply of power to the server 20 is cut off.

Next, a part of the server 20 of the computer system 1 will be described in detail.

Figure 3:
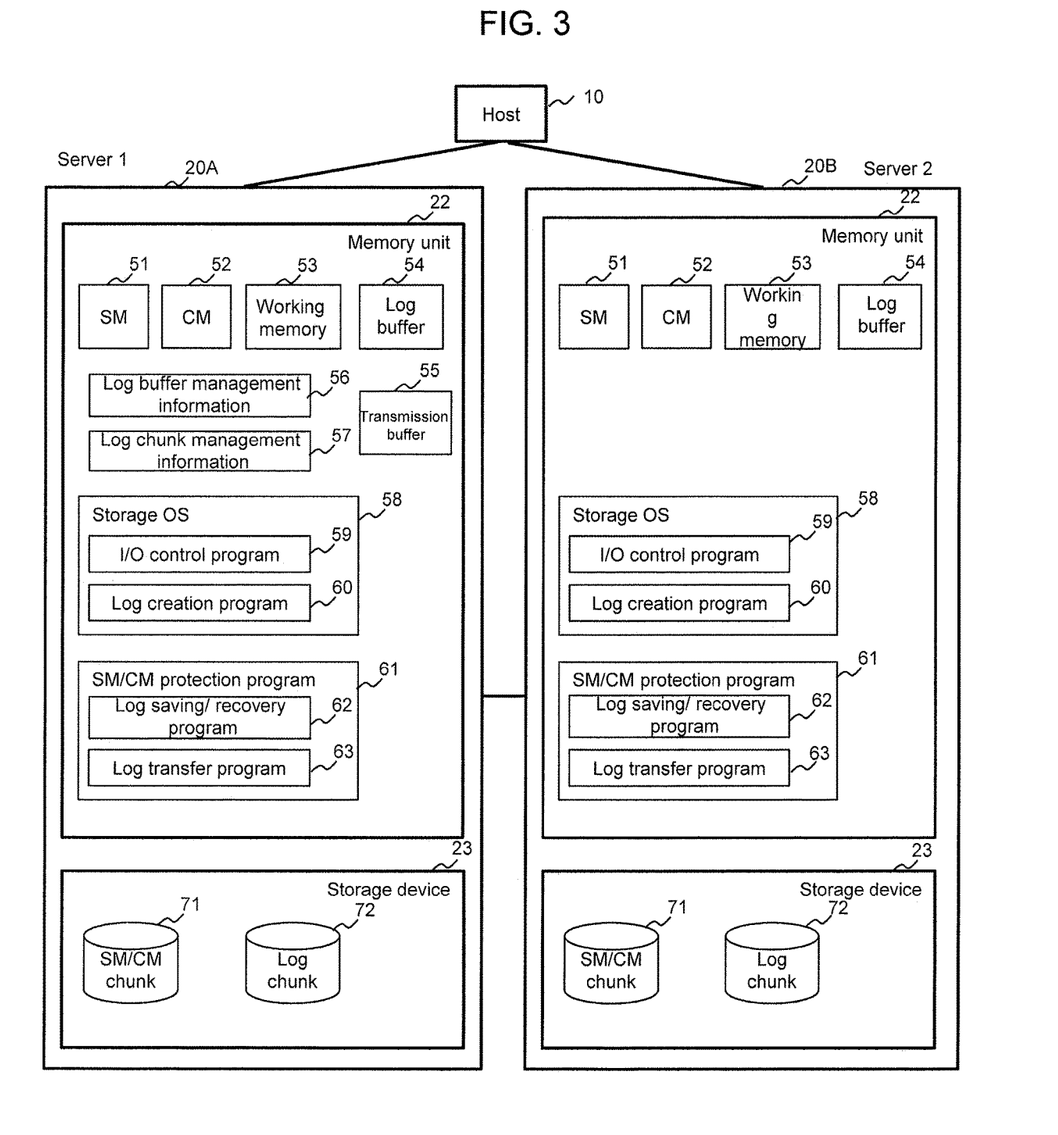
FIG. 3 is a configuration diagram showing, in detail, a part of the computer system according to the embodiment.

FIG. 3 is a configuration diagram showing, in detail, a part of the computer system according to the embodiment. Note that similar components of the server 20A and the server 20B are assigned same reference symbols.

The memory unit 22 of the server 20A includes an SM (shared memory) 51, a CM (cache memory) 52, a working memory 53, a log buffer 54, and a transmission buffer 55.

The SM 51 stores various pieces of management information. A storage area of the SM 51 corresponds to a management area. Examples of management information include storage position management information indicating a correspondence between an address (storage position information) in the storage device 23 of data cached in the CM 52 and an address where the data is cached in the CM 52, statistical information related to I/O processes (IOPS (Input/Output Per Second), an average response time, and the like), configuration information (logical configuration information) on volumes created in the storage device 23 of the server 20, a pair state related to remote copy, and the like, and configuration (physical configuration information) related to components (processors and drives) mounted to the server 20.

The CM 52 caches data (target data) having become a target of an I/O request. A storage area of the CM 52 corresponds to a cache area. The CM 52 caches data (write data) associated with a write request from the host 10. In addition, in response to a read request from the host 10, the CM 52 stores data (read data) read out from the storage device 23.

The working memory 53 is used as a work area for processes performed by the processor unit 21. The log buffer 54 stores log data 50 (refer to FIG. 4) indicating contents of updates of the SM 51 and the CM 52 which needs to be maintained even during a power failure. In the present embodiment, pieces of log data each corresponding to each content of update with respect to the SM 51 and CM 52 are stored in the log buffer 54.

The transmission buffer 55 stores log data indicating contents of update with respect to information that needs to be managed in duplex among the contents of update of the SM 51 and the CM 52. In the present embodiment, pieces of log data each corresponding to each content of update of the CM 52 and log data corresponding to contents of update with respect to a part of information in the SM 51 are stored in the transmission buffer 55. The pieces of log data in the transmission buffer 55 are targets to be transmitted to the server 20 (20B) that constitutes a pair.

In addition, the memory unit 22 stores log buffer management information 56, log chunk management information 57, a storage OS (Operating System) 58, and an SM/CM protection program 61.

The log buffer management information 56 is information for managing log data in the log buffer 54. The log chunk management information 57 is information for managing log data in the log chunk 72.

The storage OS 58 is an OS that enables the server 20 to operate as a storage apparatus for managing data. The storage OS 58 includes an I/O control program 59 and a log creation program 60.

When executed by the processor unit 21, the I/O control program 59 receives an I/O request from the host 10 and controls I/O of data corresponding to the I/O request. Specifically, when the I/O control program 59 receives a read request from the host 10 while being executed by the processor unit 21, if data (read data) corresponding to the read request is present in the CM 52, the I/O control program 59 reads the data from the CM 52 and transmits the data to the host 10, but if the read data is not present in the CM 52, the I/O control program 59 reads the read data from the storage device 23, stores the read data in the CM 52, and transmits the read data to the host 10. In addition, when the I/O control program 59 receives a write request from the host 10 while being executed by the processor unit 21, the I/O control program 59 receives data (write data) corresponding to the write request and stores the write data in the CM 52 and, subsequently, stores the write data in the storage device 23.

When executed by the processor unit 21, the log creation program 60 executes a process involving creating log data based on contents of update in the SM 51 and the CM 52 and storing the created log data in the log buffer 54 and the transmission buffer 55.

The SM/CM protection program 61 is a program for causing the processor unit 21 to execute a process of holding the memory data of the SM 51 and the CM 52 in a recoverable state. The SM/CM protection program 61 includes a log saving/recovery program 62 and a log transfer program 63.

When executed by the processor unit 21, the log saving/recovery program 62 executes a process of storing log data stored in the log buffer 54 in the log chunk 72 and a process of creating a memory image of the SM 51 and the CM 52 in the SM/CM chunk 71 based on the log data in the log chunk 72. When executed by the processor unit 21, the log transfer program 63 executes a data transfer process between servers 20 that constitute a pair. For example, when executed by the processor unit 21, the log transfer program 63 executes a process of transmitting log data stored in the transmission buffer 55 to the log buffer 54 of the server 20 that constitutes a pair.

The storage device 23 stores the log chunk 72 and the SM/CM chunk 71. The log chunk 72 stores log data. The log chunk 72 stores log data of contents of update not reflected on the memory image in the SM/CM chunk 71. The SM/CM chunk 71 stores respective memory images of the SM 51 and the CM 52 at a given time point or, in other words, all data stored in the SM 51 and all data stored in the CM 52 at the given time point.

Next, log data will be described in detail.

Figure 4:
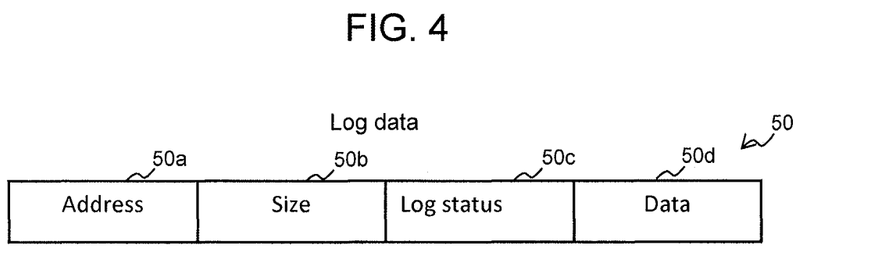
FIG. 4 is a configuration diagram of log data according to the embodiment.

FIG. 4 is a configuration diagram of log data according to the embodiment.

Log data 50 is data corresponding to each update of the SM 51 or the CM 52 and includes fields of an address 50a, a size 50b, a log status 50c, and data 50d. An address of the updated memory (the SM 51 or the CM 52) is stored in address 50a. A size of the updated data is stored in size 50b. A variable (a log status) representing a state of the log data is stored in log status 50c. Possible variables include "free" which indicates that the log data is present in the log buffer 54 and has already been created, "commit" which indicates that the log data is present in the log buffer 54 and a finalization request (to be described later) has already been issued, "destaging" which indicates that the log data is present in the log buffer 54 and a write of the log data is being performed with respect to the log chunk 72, "clean" which indicates that the log data has been written into the log chunk 72, and "updating" which indicates that the log data is being reflected onto the SM/CM chunk 71. A main body of data of the contents of update is stored in data 50d.

Next, log buffer management information and log chunk management information will be described in detail.

Figure 5:
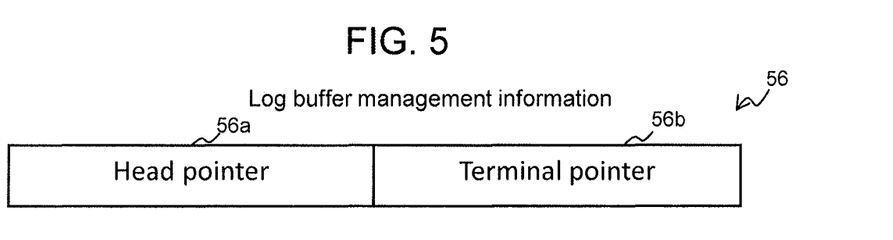
FIG. 5 is a configuration diagram of log buffer management information according to the embodiment.
Figure 6:
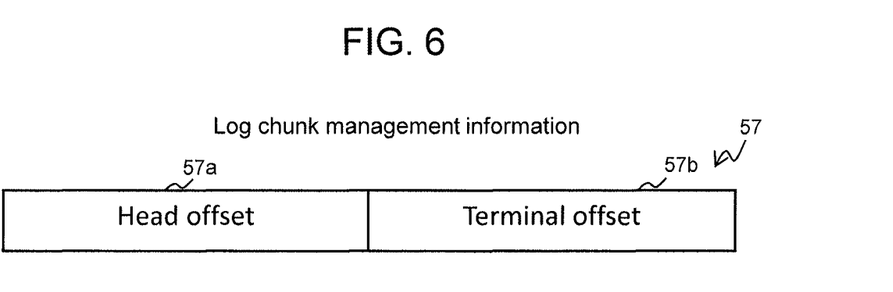
FIG. 6 is a configuration diagram of log chunk management information according to the embodiment.
Figure 7:
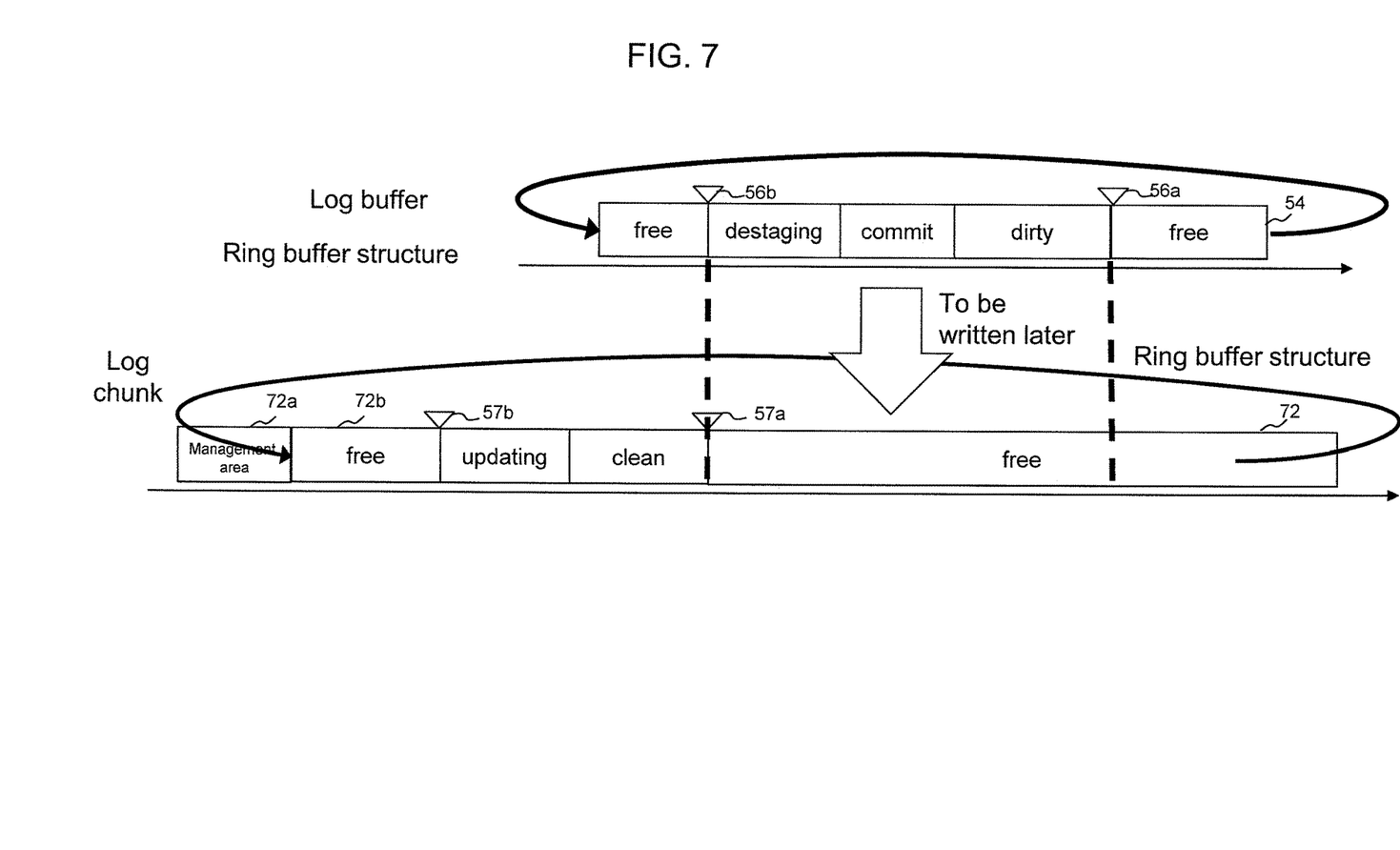
FIG. 7 is an explanatory diagram of configurations of a log buffer and a log chunk according to the embodiment.

FIG. 5 is a configuration diagram of log buffer management information according to the embodiment. FIG. 6 is a configuration diagram of log chunk management information according to the embodiment. FIG. 7 is an explanatory of configurations of a log buffer and a log chunk according to the embodiment.

As shown in FIG. 5, log buffer management information 56 includes a head pointer 56a and a terminal pointer 56b. In the present embodiment, as shown in FIG. 7, the log buffer 54 is configured as a ring buffer structure that is used in a state where a physical terminal of an area is connected to a head of the area. As shown in FIG. 7, the head pointer 56a is a pointer which indicates a head of a free area of the log buffer 54 in which data can be stored. The terminal pointer 56b is a pointer which indicates a terminal of the free area of the log buffer 54.

The log buffer management information 56 shows that the free area corresponds to an area which extends from the head pointer 56a to the terminal pointer 56b in the log buffer 54. It is also shown that log data that has already been written is stored in an area between the terminal pointer 56b and the head pointer 56a. With respect to pieces of log data between the terminal pointer 56b and the head pointer 56a, it is shown that the closer a piece of log data is to the terminal pointer 56b, the older the piece of log data, and as an example of statuses of log data, pieces of log data with statuses of destaging, commit, and dirty are arranged in this order in an ascending order of distance from the terminal pointer 56b.

As shown in FIG. 6, log chunk management information 57 includes a head offset 57a and a terminal offset 57b. In the present embodiment, the log chunk 72 includes a management area 72a and a log data storage area 72b. The management area 72a has a fixed data size and stores information (hereinafter, may also be referred to as log chunk management information 57 for the sake of convenience) which is similar to the log chunk management information 57 (the head offset 57a and the terminal offset 57b). The log data storage area 72b is configured as a ring buffer structure that is used in a state where a physical terminal of the area is connected to a head thereof. As shown in FIG. 7, the head offset 57a represents an offset (bytes) from a physical head of the log chunk 72 with respect to a head of a free area of the log data storage area 72b in which data can be stored. As shown in FIG. 7, the terminal offset 57b represents an offset (bytes) from the physical head of the log chunk 72 with respect to a terminal of the free area of the log data storage area 72b in which data can be stored.

The log chunk management information 57 shows that the free area corresponds to an area which extends from a position of the head offset 57a to a position of the terminal offset 57b in the log data storage area 72b of the log chunk 72. In addition, with respect to pieces of log data between the position of the terminal offset 57b and the position of the head offset 57a, it is shown that the closer apiece of log data is to the position of the terminal offset 57b, the older the piece of log data, and as an example of statuses of log data, pieces of log data with statuses of updating and clean are arranged in this order in an ascending order of distance from the terminal offset 57b. Log data stored after an area indicated by the terminal pointer 56b of the log buffer 54 is to be stored in a free area after the head offset 57a of the log chunk 72.

Next, an I/O process in the computer system 1 according to the embodiment will be described.

Figure 8:
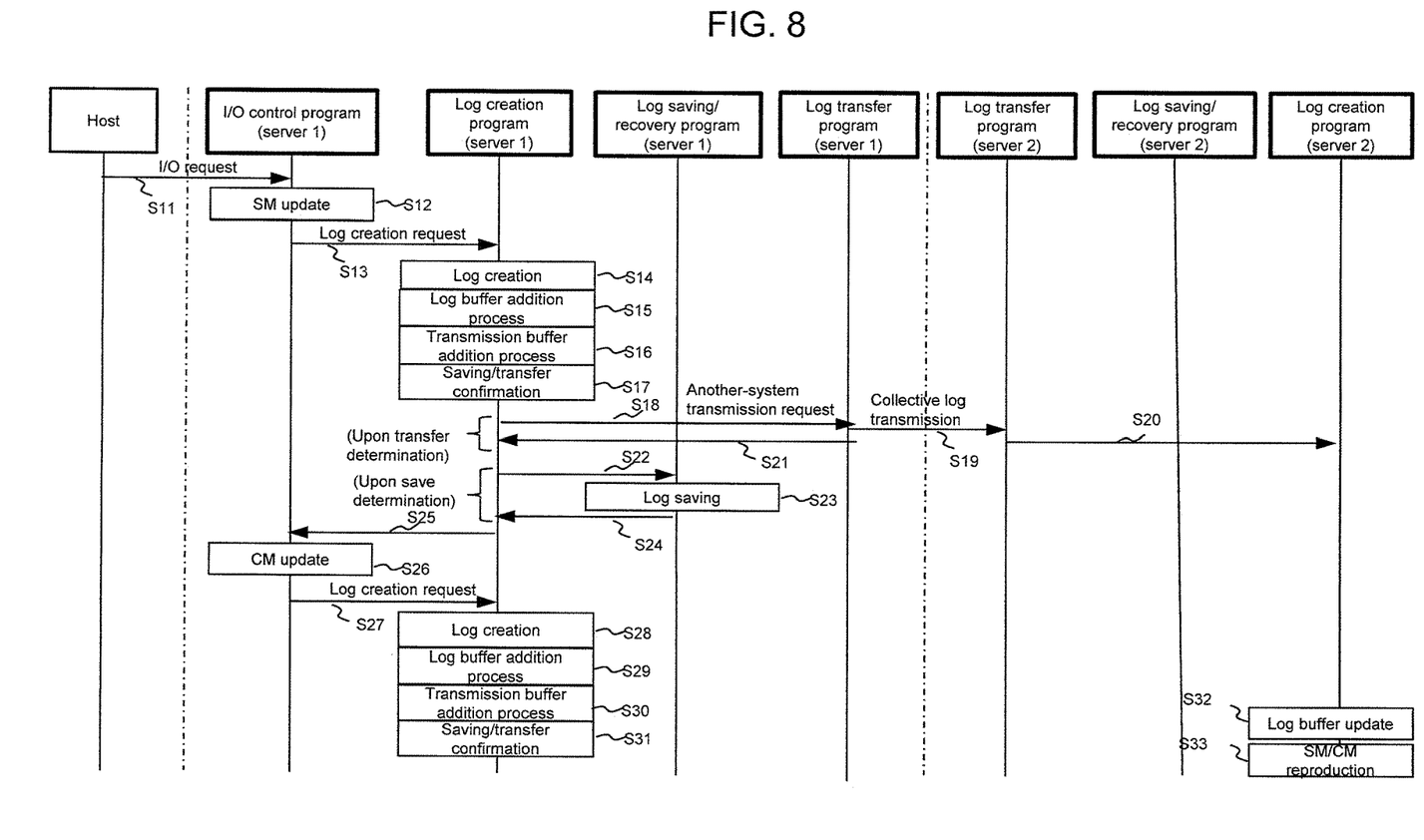
FIG. 8 is a sequence diagram of an I/O process according to the embodiment.

FIG. 8 is a sequence diagram of an I/O process according to the embodiment.

When the host 10 issues an I/O request (S11), the I/O control program 59 (strictly speaking, the processor unit 21 which executes the I/O control program 59) of the server 20A (the server 1) performs an update of the SM 51 in accordance with the I/O request (S12). For example, when the I/O request is a write request, information (storage position management information) for managing a storage position in the CM 52 with respect to write data accompanying the write request and the like are updated. Next, the I/O control program 59 transmits a request (a log creation request) to create a log corresponding to contents of update of the SM 51 to the log creation program 60 (S13).

When the log creation program 60 receives the log creation request, the log creation program 60 performs a process of creating log data corresponding to the contents of update of the SM 51 (S14) and adding the created log data to the log buffer 54 (S15). Here, the log creation program 60 sets the log status of the log data added to the log buffer 54 to dirty. In addition, the log creation program 60 updates the head pointer 56a of the log buffer management information 56 in accordance with the added log data. Next, the log creation program 60 stores log data corresponding to contents (for example, the storage position management information) to be duplexed among the created pieces of log data in the transmission buffer 55 (S16).

Next, the log creation program 60 executes a process of confirming saving of the log data stored in the log buffer 54 and confirming transfer of the log data stored in the transmission buffer 55 (S17). Specifically, the log creation program 60 determines whether or not an amount of the log data stored in the log buffer 54 is equal to or larger than a prescribed threshold, makes a determination to save the log data stored in the log buffer 54 to the log chunk 72 when the amount of the data is equal to or larger than the prescribed threshold, but makes a determination not to save the log data when the amount of the data is not equal to or larger than the prescribed threshold. In addition, the log creation program 60 determines whether or not an amount of the log data stored in the transmission buffer 55 is equal to or larger than a prescribed threshold, makes a determination to transfer the log data stored in the transmission buffer 55 to the server 20B (the server 2) when the amount of the data is equal to or larger than the prescribed threshold, but makes a determination not to transfer the log data when the amount of the data is not equal to or larger than the prescribed threshold. Here, the prescribed thresholds may be determined based on, for example, a capacity of the log buffer 54 or a state of the I/O request from the host 10 and, in essence, any threshold that does not cause a free capacity of the log buffer 54 to become depleted may suffice. In addition, the threshold for determining whether or not to save log data and the threshold for determining whether or not to transfer log data may have different values.

As a result, when the log creation program 60 determines to transfer the log data stored in the transmission buffer 55 to the server 20B (upon transfer determination), the log creation program 60 transmits, to the log transfer program 63, a transfer request to another system (the server 20B) (S18). When the log transfer program 63 receives a transfer request to another system, the log transfer program 63 collectively transfers the pieces of log data stored in the transmission buffer 55 to the server 20B (S19). When there are a plurality of pieces of log data of contents of update with respect to a same address and a same size (a same address and range) in the transmission buffer 55, the log transfer program 63 may keep a latest piece of log data while deleting the other pieces of log data and transfer the latest piece of log data. As a result, in the server 20B, the log transfer program 63 hands over, to the log creation program 60, the log data transmitted from the log transfer program 63 of the server 20A (S20). On the other hand, once transfer of the log data is finished, the log transfer program 63 of the server 20A notifies the log creation program 60 that the transfer of the log data has finished (S21). In the server 20B, the log creation program 60 stores the log data in the log buffer 54 (S32) and the log creation program 60 reflects contents of the log data in the log buffer 54 onto the SM 51 and the CM 52 (S33).

In addition, when the log creation program 60 determines to save the log data stored in the log buffer 54 to the log chunk 72 (upon save determination), the log creation program 60 transmits a save request to the log saving/recovery program 62 (S22). The log saving/recovery program 62 having received the save request saves the log data stored in the log buffer 54 to the log chunk 72 (S23). When there are a plurality of pieces of log data of contents of update with respect to a same address and a same size (a same address range) in the log buffer 54, the log saving/recovery program 62 may keep a latest piece of log data while deleting the other pieces of log data and save the latest piece of log data. In accordance with the saved log data, the log saving/recovery program 62 updates the terminal pointer 56b of the log buffer management information 56, updates the head offset 57a of the log chunk management information 57, and stores the head offset 57a in the management area 72a of the log chunk 72. In doing so, when there are plurality of pieces of log data in the log buffer 54, the log saving/recovery program 62 collectively saves the pieces of log data to the log chunk 72. Here, since a minimum access unit (for example, 512 bytes) is defined in data transfer to the storage device 23 which includes the log chunk 72, for example, even when transferring data that is smaller than the minimum access unit, data transfer must take place in the minimum access unit and transfer efficiency declines. In contrast, in the present embodiment, by collectively transferring a plurality of pieces of log data, transfer efficiency can be improved as compared to a case where each piece of log data is individually transmitted. Next, once saving of the log data is finished, the log saving/recovery program 62 notifies the log creation program 60 that the saving of the log data has finished (S24).

When the log creation program 60 received notification that transfer of log data has finished, when the log creation program 60 received notification that saving of log data has finished, or when the log creation program 60 determines not to transfer log data or not to save log data, the log creation program 60 notifies the I/O control program 59 that a log creation process of the SM 51 has finished.

Next, the I/O control program 59 of the server 20A performs an update of the CM 52 in accordance with the I/O request (S26). For example, when the I/O request is a write request, write data accompanying the write request is stored in the CM 52, and when the I/O request is a read request and read data corresponding to the read request is not stored in the CM 52, the read data is read out from the storage device 23 and stored in the CM 52.

Next, the I/O control program 59 transmits a request (a log creation request) to create a log corresponding to contents of update of the CM 52 to the log creation program 60 (S27).

When the log creation program 60 receives the log creation request, the log creation program 60 performs a process of creating log data corresponding to the contents of update of the CM 52 (S28) and adding the created log data to the log buffer 54 (S29). Next, the log creation program 60 stores the created log data in the transmission buffer 55 (S30).

Next, the log creation program 60 executes a process of confirming saving of the log data stored in the log buffer 54 and confirming transfer of the log data stored in the transmission buffer 55 (S31). This process is similar to the process of step S17. In addition, processes similar to S18 to S25 are to be executed after executing step S31.

Next, an I/O response process will be described.

Figure 9:
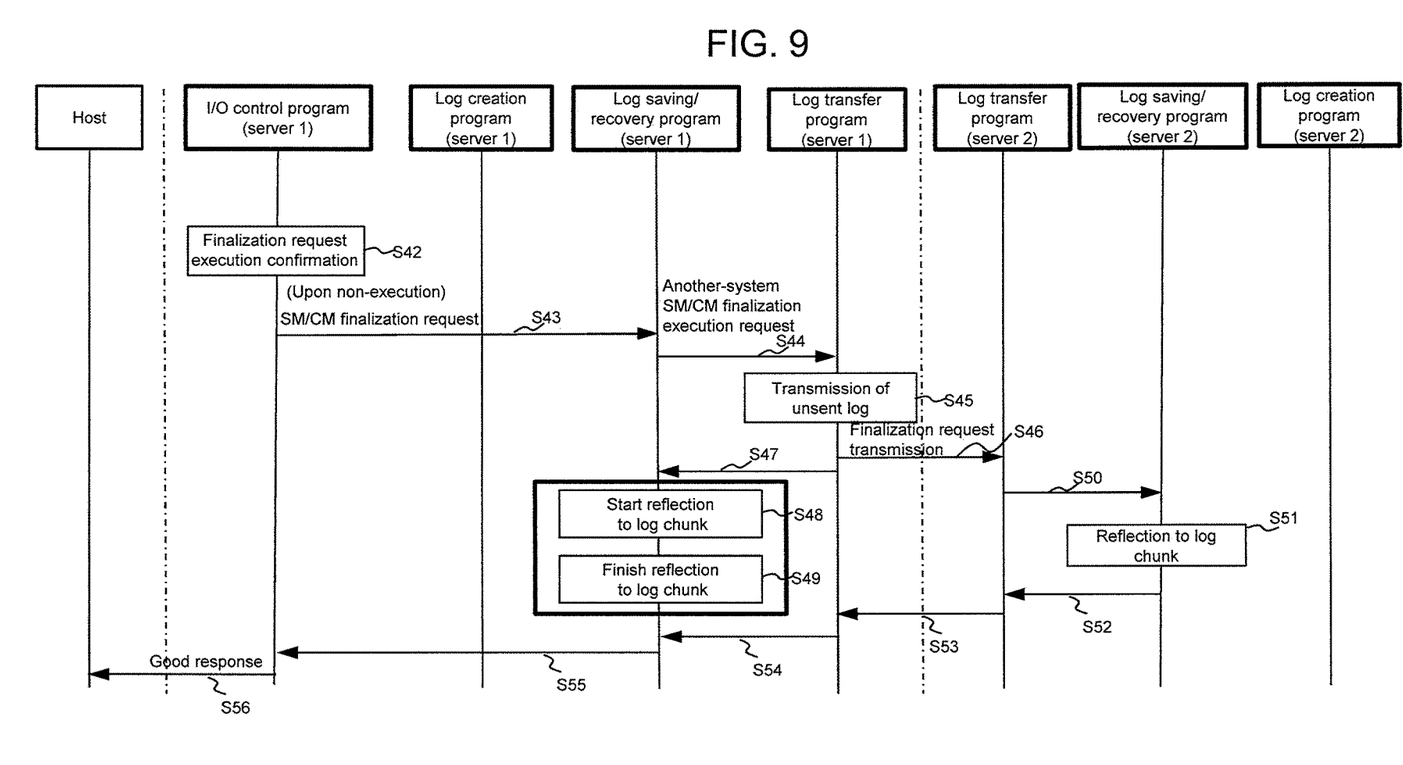
FIG. 9 is a sequence diagram of an I/O response process according to the embodiment.

FIG. 9 is a sequence diagram of an I/O response process according to the embodiment. For example, the I/O response process is executed after the I/O process shown in FIG. 8 or at predetermined intervals.

First, the I/O control program 59 determines whether or not a process of a request (a finalization request) to finalize contents of update of the SM 51 and the CM 52 in accordance with the I/O request is being executed (S42). Here, for example, the process of a finalization request is a process of saving the log data stored in the log buffer 54 to the log chunk 72 and transmitting a response of good to a request source of the I/O request. As a result, when the process of a finalization request is being executed, since a finalization request cannot be issued, the I/O control program 59 ends the I/O response process.

On the other hand, when the process of a finalization request is not being executed (upon non-execution) or, in other words, when the I/O request is a first I/O request or when a finalization request corresponding to a previous I/O request has not been completed, the I/O control program 59 transmits an SM/CM finalization request related to the I/O request that has not been completed (of which a response has not been returned) to the log saving/recovery program (S43).

When the log saving/recovery program 62 receives the SM/CM finalization request, the log saving/recovery program 62 transmits a request to execute SM/CM finalization with respect to another system (the server 20B) to the log transfer program 63. When there is unsent log data in the transmission buffer 55, the log transfer program 63 transmits the unsent log data to the server 20B (S45).

Next, the log transfer program 63 transmits an SM/CM finalization request to the log transfer program 63 of the server 20B (S46) and transmits, to the log saving/recovery program 62, a response to the another-system SM/CM finalization request (S47).

When the log saving/recovery program 62 receives the response to the another-system SM/CM finalization request, the log saving/recovery program 62 starts reflecting (saving) log data stored in the log buffer 54 to the log chunk 72 (S48) and finishes reflecting the log data to the log chunk 72 (S49). As a result, log data indicating contents of update of the SM 51 and the CM 52 at that time point are present in the log chunk 72 and, even when a power failure occurs, necessary log data can be kept stored without being erased.

On the other hand, in the server 20B, when the log transfer program 63 receives the SM/CM finalization request, the log transfer program 63 instructs the log saving/recovery program 62 to save the log data stored in the log buffer 54 to the log chunk 72 (S50). When the log saving/recovery program 62 receives the save instruction, the log saving/recovery program 62 reflects the log data stored in the log buffer 54 onto the log chunk 72 (S51) and, after finishing reflecting the log data, the log saving/recovery program 62 transmits a completion notification to the log transfer program 63 (S52). Upon receiving the completion notification, the log transfer program 63 transmits the completion notification to the log transfer program 63 of the server 20A (S53). When the log transfer program 63 of the server 20A receives the completion notification, the log transfer program 63 transmits a response to the another-system SM/CM finalization request to the log saving/recovery program 62 (S54).

When the log saving/recovery program 62 finishes the process of step S49 and receives the response to the another-system SM/CM finalization request in step S54, the log saving/recovery program 62 transmits, to the I/O control program 59, a finalization completion response corresponding to the SM/CM finalization request (S55).

Next, when the I/O control program 59 receives the finalization completion response corresponding to the SM/CM finalization request, the I/O control program 59 transmits, to the host 10, a response of good with respect to the I/O request corresponding to the SM/CM finalization request (S56). Accordingly, the host 10 can be informed that the processes corresponding to the I/O request have been completed.

Next, a transmission of a finalization request during an I/O process will be described.

Figure 10:
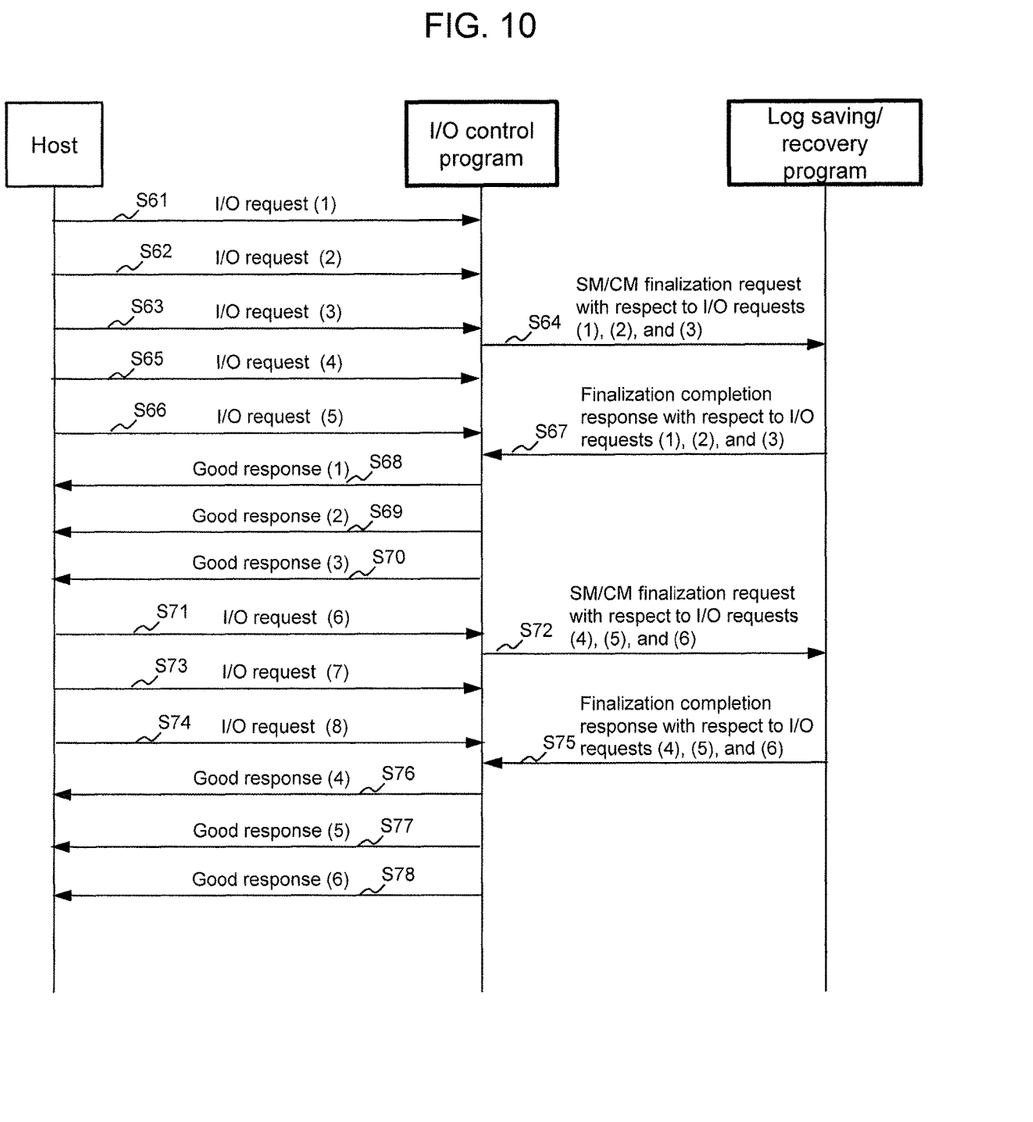
FIG. 10 is an explanatory diagram of a transmission of a finalization request during an I/O process according to the embodiment.

FIG. 10 is an explanatory of the transmission of a finalization request during an I/O process according to the embodiment.

The I/O control program 59 receives an I/O request (1) from the host 10 (S61), and when a finalization request already being executed has not been completed, the I/O control program 59 does not issue (transmit) an SM/CM finalization request. In a similar manner, the I/O control program 59 receives an I/O request (2) from the host 10 (S62), and when a finalization request already being executed has not been completed, the I/O control program 59 does not issue an SM/CM finalization request.

Subsequently, the I/O control program 59 receives an I/O request (3) from the host 10 (S63), and when a finalization request already being executed has been completed, the I/O control program 59 transmits, to the log saving/recovery program 62, an SM/CM finalization request with respect to I/O requests (1), (2), and (3) for which a finalization request has not been issued (S64).

Next, when the I/O control program 59 receives I/O requests (4) and (5) from the host 10 (S65 and S66), since the SM/CM finalization request transmitted in S64 has not been completed, the I/O control program 59 does not issue an SM/CM finalization request.

Next, when the I/O control program 59 receives a finalization completion response to the SM/CM finalization request with respect to the I/O requests (1), (2), and (3) from the log saving/recovery program 62 (S67), the I/O control program 59 transmits, to the host 10, a Good response (1) corresponding to the I/O request (1), a Good response (2) corresponding to the I/O request (2), and a Good response (3) corresponding to the I/O request (3) (S68, S69, and S70).

Next, when the I/O control program 59 receives an I/O request (6) from the host 10 (S71), since the executed finalization request has been completed, the I/O control program 59 transmits, to the log saving/recovery program 62, an SM/CM finalization request with respect to I/O requests (4), (5), and (6) for which a finalization request has not been issued (S72).

Subsequently, when the I/O control program 59 receives I/O requests (7) and (8) from the host 10 (S73 and S74), since the SM/CM finalization request transmitted in S64 has not been completed, the I/O control program 59 does not issue an SM/CM finalization request.

Next, when the I/O control program 59 receives a finalization completion response to the SM/CM finalization request with respect to the I/O requests (4), (5), and (6) from the log saving/recovery program 62 (S75), the I/O control program 59 transmits, to the host 10, a Good response (4) corresponding to the I/O request (4), a Good response (5) corresponding to the I/O request (5), and a Good response (6) corresponding to the I/O request (6) (S76, S77, and S78).

Next, an SM/CM chunk update process will be described.

Figure 11:
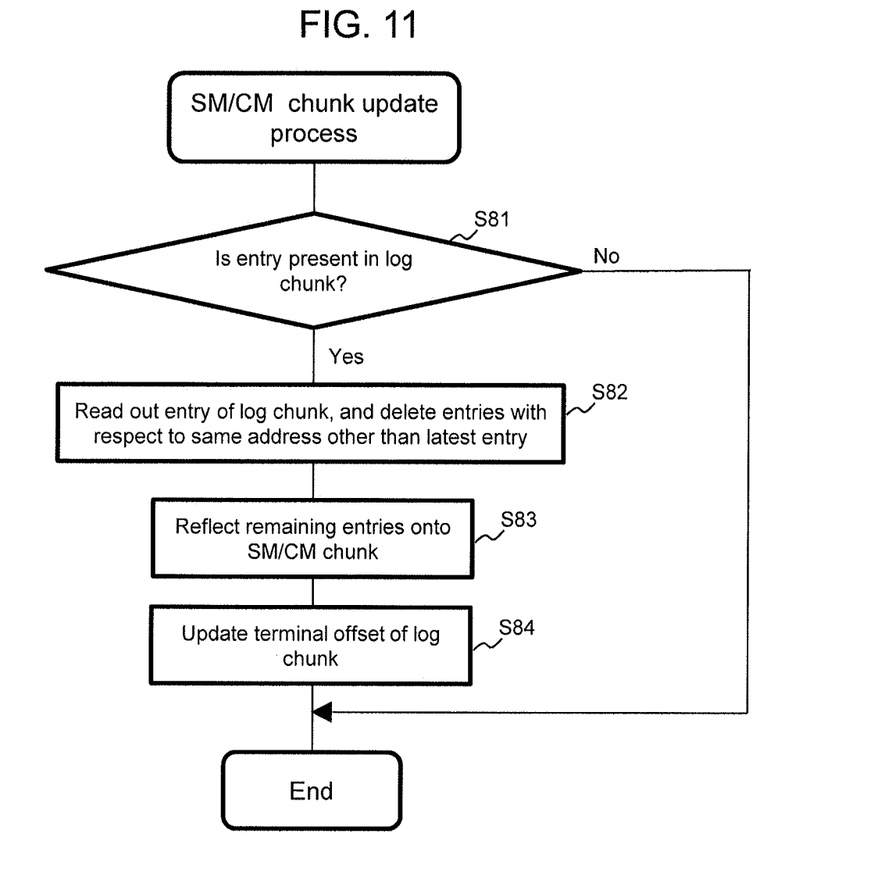
FIG. 11 is a flow chart of an SM/CM chunk update process according to the embodiment.

FIG. 11 is a flow chart of an SM/CM chunk update process according to the embodiment.

The SM/CM chunk update process is a process that is executed by, for example, the log saving/recovery program 62. The SM/CM chunk update process may be performed at an arbitrary timing that is asynchronous with an I/O request and, for example, the SM/CM chunk update process may be performed when an amount of data of the log chunk 72 is equal to or larger than a prescribed threshold or when a frequency of I/O requests from the host 10 is low.

The log saving/recovery program 62 (strictly speaking, the processor unit 21 which executes the log saving/recovery program 62) determines whether or not an entry (log data) is present in the log chunk 72 (S81). As a result, when the log saving/recovery program 62 determines that an entry is not present in the log chunk 72 (S81: No), the log saving/recovery program 62 ends the SM/CM chunk update process.

On the other hand, when the log saving/recovery program 62 determines that an entry is present in the log chunk 72 (S81: Yes), the log saving/recovery program 62 reads the entry of the log chunk 72 to the working memory 53, and when there are a plurality of entries of contents of update with respect to a same address and a same size in the SM 51 or the CM 52, the log saving/recovery program 62 retains a latest entry and deletes the other entries (S82). Accordingly, since the number of entries used in an update can be reduced, processing efficiency can be improved.

Next, the log saving/recovery program 62 reflects data of the remaining entries to a corresponding area of a memory image in the SM/CM chunk 71 (S83). In accordance with a state of progress of the process during this time, the log saving/recovery program 62 changes the log status of the log data in the order of clean, updating, and free. Next, the log saving/recovery program 62 sets the terminal offset 57*b* of the log chunk management information 57 (the log chunk management information 57 of the management area 72*a* of the log chunk 72 is processed in a similar manner) to a same value as the head offset 57*a* (S84), and finishes the process.

According to the SM/CM chunk update process described above, contents of update due to log data stored in the log chunk 72 can be appropriately reflected on the memory image in the SM/CM chunk 71.

Next, a recovery process will be described.

Figure 12:
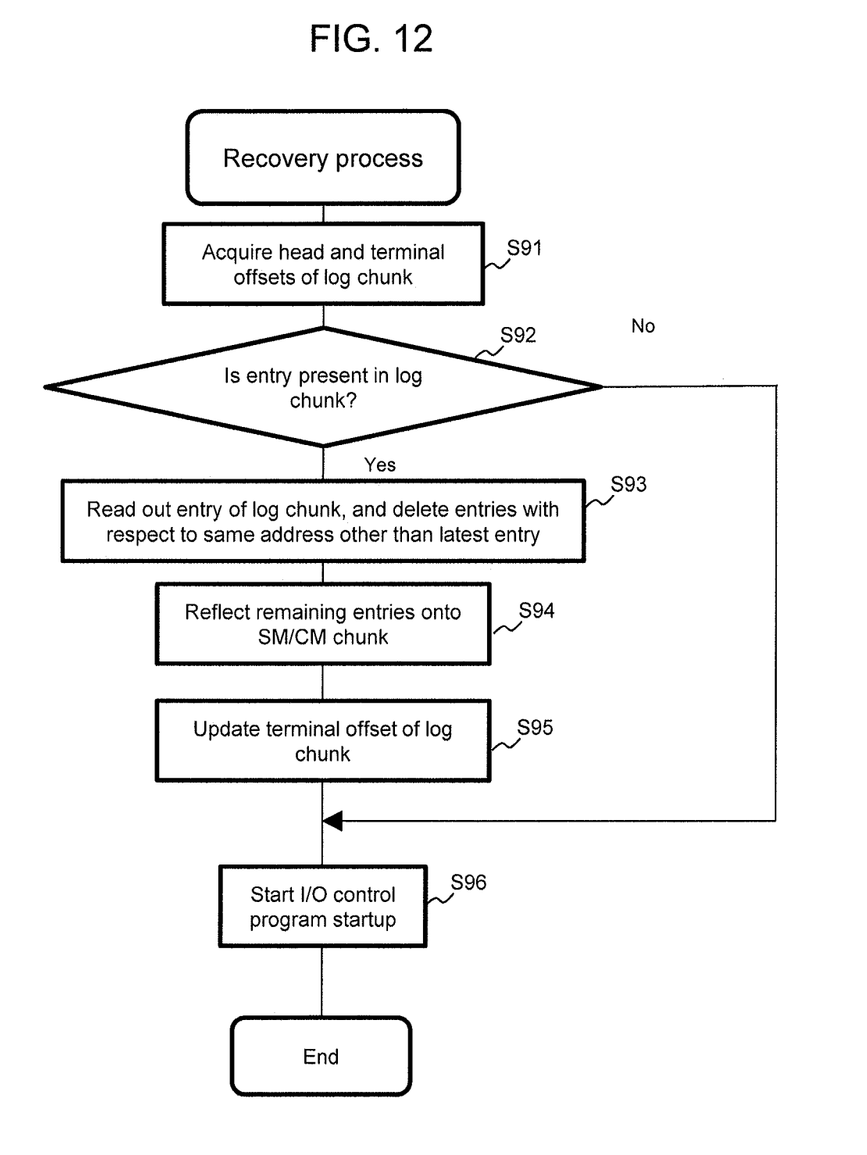
FIG. 12 is a flow chart of a recovery process according to the embodiment.

FIG. 12 is a flow chart of a recovery process according to the embodiment.

The recovery process is executed by the log saving/recovery program 62 after, for example, an occurrence of a power failure.

The log saving/recovery program 62 acquires the head offset 57*a* and the terminal offset 57*b* of the log chunk management information 57 from the management area 72*a* of the log chunk 72 and stores the head offset 57*a* and the terminal offset 57*b* in the memory unit 22 (S91). Next, the log saving/recovery program 62 determines whether or not an entry (log data) is present in the log chunk 72 (S92). As a result, when the log saving/recovery program 62 determines that an entry is not present in the log chunk 72 (S92: No), since this means that the memory image in the SM/CM chunk 71 represents the states of the SM 51 and the CM 52 having been finalized upon the occurrence of a power failure, the log saving/recovery program 62 advances the process to step S96.

On the other hand, when the log saving/recovery program 62 determines that an entry is present in the log chunk 72 (S92: Yes), the log saving/recovery program 62 reads the entry of the log chunk 72 to the working memory 53, and when there are a plurality of entries of contents of update with respect to a same address and a same size (a same address and range) in the SM 51 or the CM 52, the log saving/recovery program 62 retains a latest entry and deletes the other entries (S93). Accordingly, since the number of entries used in an update can be reduced, processing efficiency can be improved.

Next, the log saving/recovery program 62 reflects data of the remaining entries to a corresponding area of the memory image in the SM/CM chunk 71 (S94). In accordance with a state of progress of the process during this time, the log saving/recovery program 62 changes the log status of the log data in the order of clean, updating, and free. Next, the log saving/recovery program 62 sets the terminal offset 57*b* of the log chunk management information 57 (the log chunk management information 57 of the management area 72*a* of the log chunk 72 is processed in a similar manner) to a same value as the head offset 57*a* (S95) and advances the process to step S96.

In step S96, the log saving/recovery program 62 starts the I/O control program 59 startup and ends the recovery process. Once the I/O control program 59 is started, the I/O control program 59 writes the memory image of the SM 51 and the CM 52 in the SM/CM chunk 71 into the SM 51 and the CM 52. Accordingly, the SM 51 and the CM 52 take on a state of the memories having been finalized at the time of occurrence of a power failure.

As described above, with the computer system according to the present embodiment, since a Good response is returned to a request source of an I/O request after storing, in the log chunk 72, log data of contents of update of the SM 51 and the CM 52 based on the I/O request, even when a power failure occurs and data of the SM 51 and the CM 52 in the memory unit 22 is lost, a recovery to a state of the memories having been finalized at the time of occurrence of the power failure (a state for which a Good response has been performed) can be performed in an appropriate manner based on the log data stored in the log chunk 72. Therefore, necessary data of the SM 51 and the CM 52 can be appropriately prevented from being erased. Although there is a possibility that, after log data is stored in the log chunk 72, a power failure may occur in a state where a Good response has not been transmitted to the host 10, in which case an I/O request for which a Good response has not been obtained by the host 10 is to be transmitted from the host 10 once again, even when such an I/O request is received, since contents of update based on the I/O request are the same as the contents of update of the log data in the log chunk 72, the data of the memories can be recovered without any hindrance.

It is to be understood that the present invention is not limited to the embodiment described above and that various modifications can be made in the invention without departing from the spirit and scope thereof.

For example, while the storage apparatus is configured using a general-purpose server apparatus in the embodiment described above, the present invention is not limited thereto and the storage apparatus can be constituted by dedicated hardware. In addition, while a storage apparatus not provided with a battery for supplying power during a power failure is exemplified in the embodiment described above, the present invention is not limited thereto and the storage apparatus may be provided with a battery. Although there is a possibility that, even when the storage apparatus is provided with a battery, supply of power may be cut off due to a failure of the battery or the like, according to the invention described above, the memory data of the SM 51 and the CM 52 can be appropriately recovered even in such situations.

In addition, while duplexing of memory data is performed between two servers 20 in the embodiment described above, the present invention is not limited thereto and duplexing need not necessarily be performed. In other words, the server 20 need not be equipped with a function to perform necessary processes for duplexing between two servers 20. For example, when duplexing is not performed, the I/O control program 59 may transmit a Good response to the host 10 when reflection of log data from the log buffer 54 to the log chunk 72 is completed.

Furthermore, a part of or all of the processes performed by the processor unit 21 in the embodiment described above may be performed by a dedicated hardware circuit. In addition, a program in the embodiment described above may be installed from a program source. The program source may be a program distribution server or a storage medium (for example, a portable storage medium).

What is claimed is:

1. A storage apparatus which receives an I/O request and manages target data being a target of the I/O request, the storage apparatus comprising:
   a memory unit, a processor unit, and a non-volatile storage device, wherein
   the memory unit has:
   a cache area for temporarily storing the target data;
   a management area for storing management information for managing the target data in the cache area; and
   a log buffer for storing log data indicating contents of change with respect to the cache area and log data indicating contents of change with respect to the management area,
   the non-volatile storage device has
   a log chunk for storing the log data, and
   the processor unit is configured to:
   store, when receiving the I/O request, target data corresponding to the I/O request in the cache area;
   generate, when the target data corresponding to the I/O request is stored in the cache area, log data of contents of change with respect to the cache area and log data of contents of change with respect to the management area, and store the pieces of the generated log data in the log buffer;
   collectively write a plurality of the pieces of log data stored in the log buffer into the log chunk; and
   transmit, after all of the pieces of log data corresponding to the I/O request are written into the log chunk, a response of good indicating that the I/O request was properly processed to a request source of the I/O request.

2. The storage apparatus according to claim 1, wherein the processor unit is configured to
   transmit, when an amount of log data stored in the log buffer becomes equal to or larger than a prescribed amount of data, a plurality of the pieces of log data stored in the log buffer to the log chunk.

3. The storage apparatus according to claim 1, wherein the processor unit is configured to
   transmit, to the log chunk, only a latest piece of log data in a plurality of pieces of log data indicating a change with respect to a same address and range in the memory unit among the plurality of the pieces of log data in the log buffer.

4. The storage apparatus according to claim 1, wherein the processor unit is configured to write the log data into the log chunk when a process of writing log data previously stored in the log buffer into the log chunk is not being executed.

5. The storage apparatus according to claim 1, wherein the processor unit is configured to generate, based on log data written into the log chunk, a memory image of the cache area and the management area at a time point when a change corresponding to the log data has been performed in a memory chunk of the non-volatile storage device.

6. The storage apparatus according to claim 5, wherein the processor unit is configured to generate a memory image of the cache area and the management area by using only a latest piece of log data with respect to a plurality of pieces of log data indicating a change with respect to a same address and range in the memory unit among the log data written into the log chunk.

7. The storage apparatus according to claim 5, wherein the processor unit is configured to update, when it is necessary to recover a state of the memory unit, the memory image generated in the memory chunk of the non-volatile storage device based on the log data written into the log chunk, and reflect the memory image on the memory unit.

8. The storage apparatus according to claim 1, wherein the processor unit is configured to transmit log data of contents of change with respect to the cache area and at least a part of log data of contents of change with respect to the management area to another storage apparatus configured to manage a copy of data managed by the storage apparatus.

9. A data management method used by a storage apparatus which receives an I/O request and manages target data being a target of the I/O request, the storage apparatus including a memory unit, a processor unit, and a non-volatile storage device, the memory unit having:
    a cache area which temporarily stores the target data;
    a management area which stores management information for managing the target data in the cache area; and
    a log buffer for storing log data indicating contents of change with respect to the cache area and log data indicating contents of change with respect to the management area, the non-volatile storage device having
a log chunk for storing the log data,
the data management method comprising the steps of:

storing, when receiving the I/O request, target data corresponding to the I/O request in the cache area;

generating, when the target data corresponding to the I/O request is stored in the cache area, log data of contents of change with respect to the cache area and log data of contents of change with respect to the management area, and storing the pieces of the generated log data in the log buffer;

collectively writing a plurality of the pieces of log data stored in the log buffer into the log chunk; and transmitting, after all of the pieces of log data corresponding to the I/O request are written into the log chunk, a response of good indicating that the I/O request was properly processed to a request source of the I/O request.

10. A non-transitory computer readable medium storing data management program to be executed by a computer constituting a storage apparatus which receives an I/O request, and stores and manages target data being a target of the I/O request, the computer including a memory unit, a processor unit, and a non-volatile storage device, the memory unit having:
    a cache area which temporarily stores the target data;
    a management area which stores management information for managing the target data in the cache area; and
    a log buffer for storing log data indicating contents of change with respect to the cache area and log data indicating contents of change with respect to the management area, the non-volatile storage device having
a log chunk for storing the log data,
the data management program causing the computer to:

store, when receiving the I/O request, target data corresponding to the I/O request in the cache area;

generate, when the target data corresponding to the I/O request is stored in the cache area, log data of contents of change with respect to the cache area and log data of contents of change with respect to the management area, and store the pieces of the generated log data in the log buffer;

collectively write a plurality of the pieces of log data stored in the log buffer into the log chunk; and transmit, after all of the pieces of log data corresponding to the I/O request are written into the log chunk, a response of good indicating that the I/O request was properly processed to a request source of the I/O request.

* * * * *